(12) United States Patent
Simonetti

(10) Patent No.: US 6,451,386 B1
(45) Date of Patent: Sep. 17, 2002

(54) MODIFIED POLYMER HAVING IMPROVED PROPERTIES AND PROCESS FOR MANUFACTURING SAME

(75) Inventor: John A. Simonetti, Thousand Oaks, CA (US)

(73) Assignee: PTI Advanced Filtration, Inc., Oxnard, CA (US)

( * ) Notice: Subject to any disclaimer, the term of this patent is extended or adjusted under 35 U.S.C. 154(b) by 0 days.

(21) Appl. No.: 09/651,185

(22) Filed: Aug. 30, 2000

(51) Int. Cl.$^7$ ............... C08F 2/48; C08J 7/04
(52) U.S. Cl. ............ 427/512; 427/508; 427/595; 427/601; 427/553; 522/134; 522/135; 522/142; 522/155; 522/156; 522/161; 522/160; 522/151; 264/413; 264/425
(58) Field of Search ............... 522/134, 135, 522/142, 155, 156, 161, 160, 151; 427/512, 508, 595, 601, 553; 264/413, 425

(56) References Cited

U.S. PATENT DOCUMENTS

| | | | | |
|---|---|---|---|---|
| 3,090,664 A | * | 5/1963 | Cline et al. .................. | 8/115.5 |
| 3,900,528 A | * | 8/1975 | Beer ........................... | 525/292 |
| 3,900,529 A | * | 8/1975 | Beer ........................... | 525/292 |
| 3,959,895 A | * | 6/1976 | Lonning ..................... | 36/32 R |
| 4,104,210 A | * | 8/1978 | Coran et al. ................ | 525/192 |
| 4,196,065 A | * | 4/1980 | Gaussens et al. ....... | 204/159.17 |
| 4,355,053 A | * | 10/1982 | Nezu et al. ................ | 427/54.1 |
| 4,603,058 A | * | 7/1986 | Adams ....................... | 427/54.1 |
| 4,845,132 A | * | 7/1989 | Masuoka et al. .......... | 210/490 |
| 5,051,312 A | * | 9/1991 | Allmer ....................... | 428/458 |
| 5,180,492 A | * | 1/1993 | Ohnishi et al. ............. | 210/490 |
| 5,209,849 A | * | 5/1993 | Hu et al. ..................... | 210/490 |
| 5,773,488 A | * | 6/1998 | Allmer ....................... | 522/46 |
| 5,788,862 A | * | 8/1998 | Degen et al. ............... | 210/651 |
| 5,871,823 A | * | 2/1999 | Anders et al. .............. | 427/512 |

* cited by examiner

Primary Examiner—James J. Seidleck
Assistant Examiner—Sanza L McClendon
(74) Attorney, Agent, or Firm—Pillsbury Winthrop LLP

(57) ABSTRACT

A process using acrylate monomers and ultraviolet light permits modification of porous polymeric materials without the use of a free radical initiator is described as is the material so modified. The modified polymeric material exhibits new properties such as wetability and advantageous flow characteristics that are useful in filtration.

50 Claims, 14 Drawing Sheets

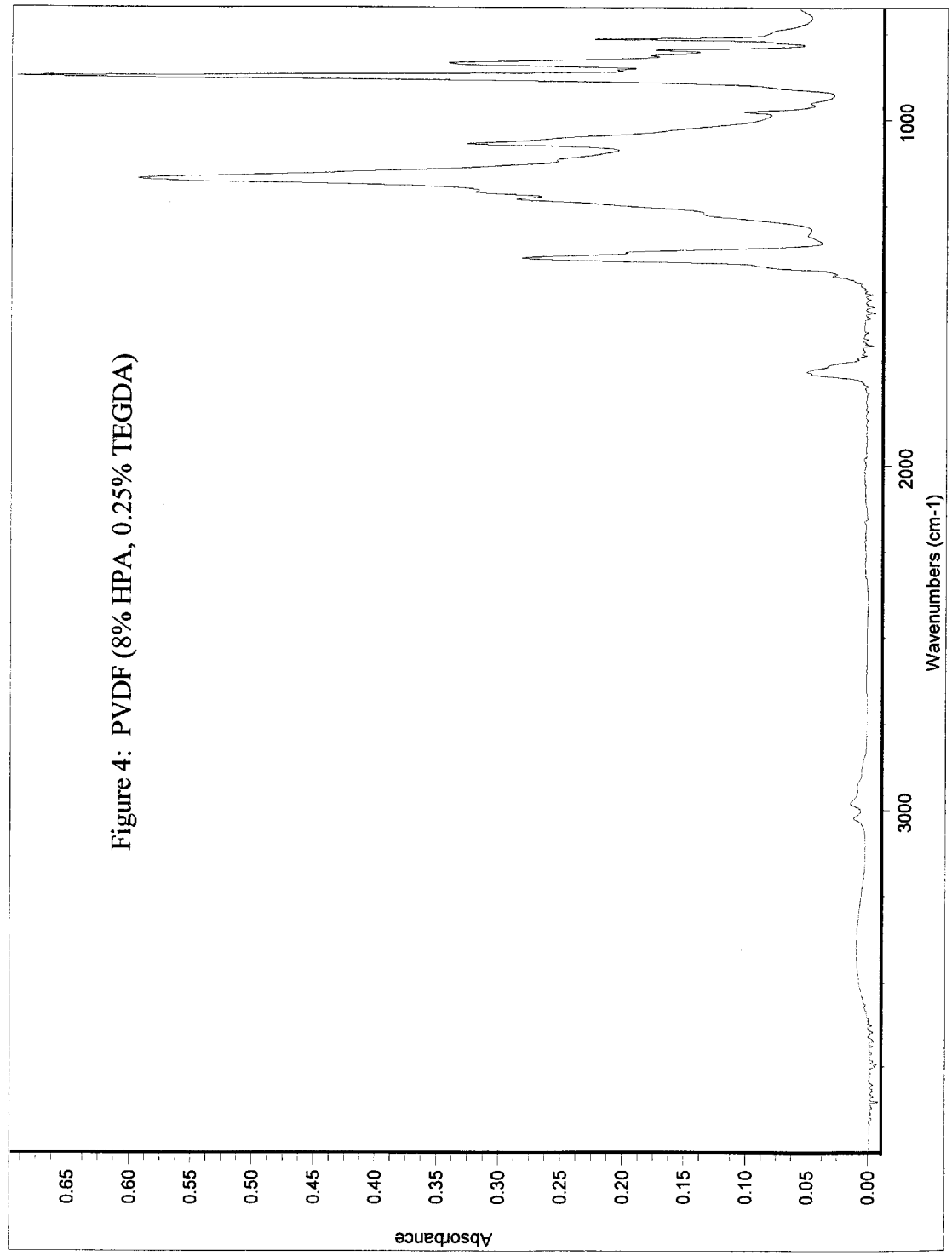
Figure 4: PVDF (8% HPA, 0.25% TEGDA)

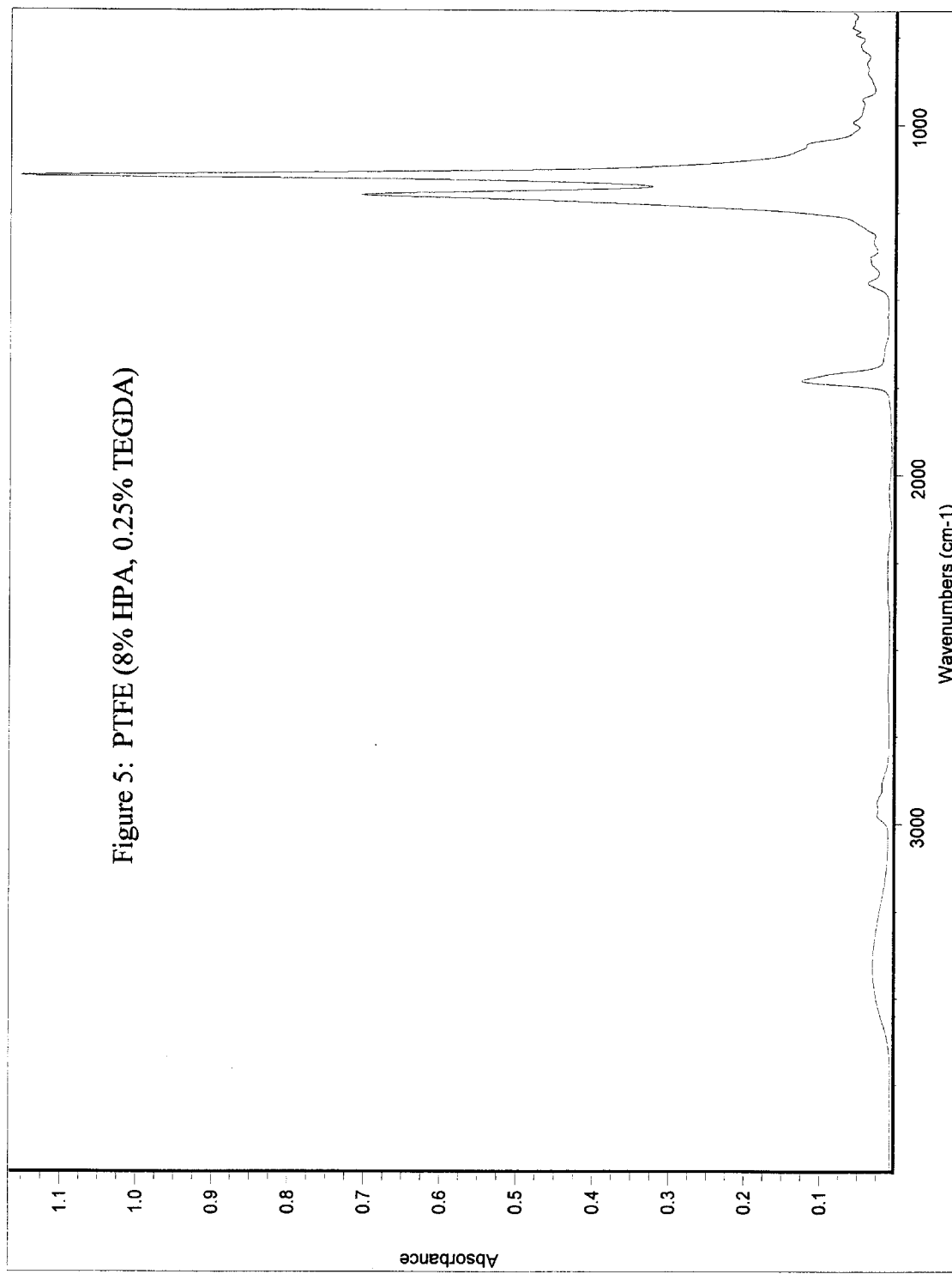
Figure 5: PTFE (8% HPA, 0.25% TEGDA)

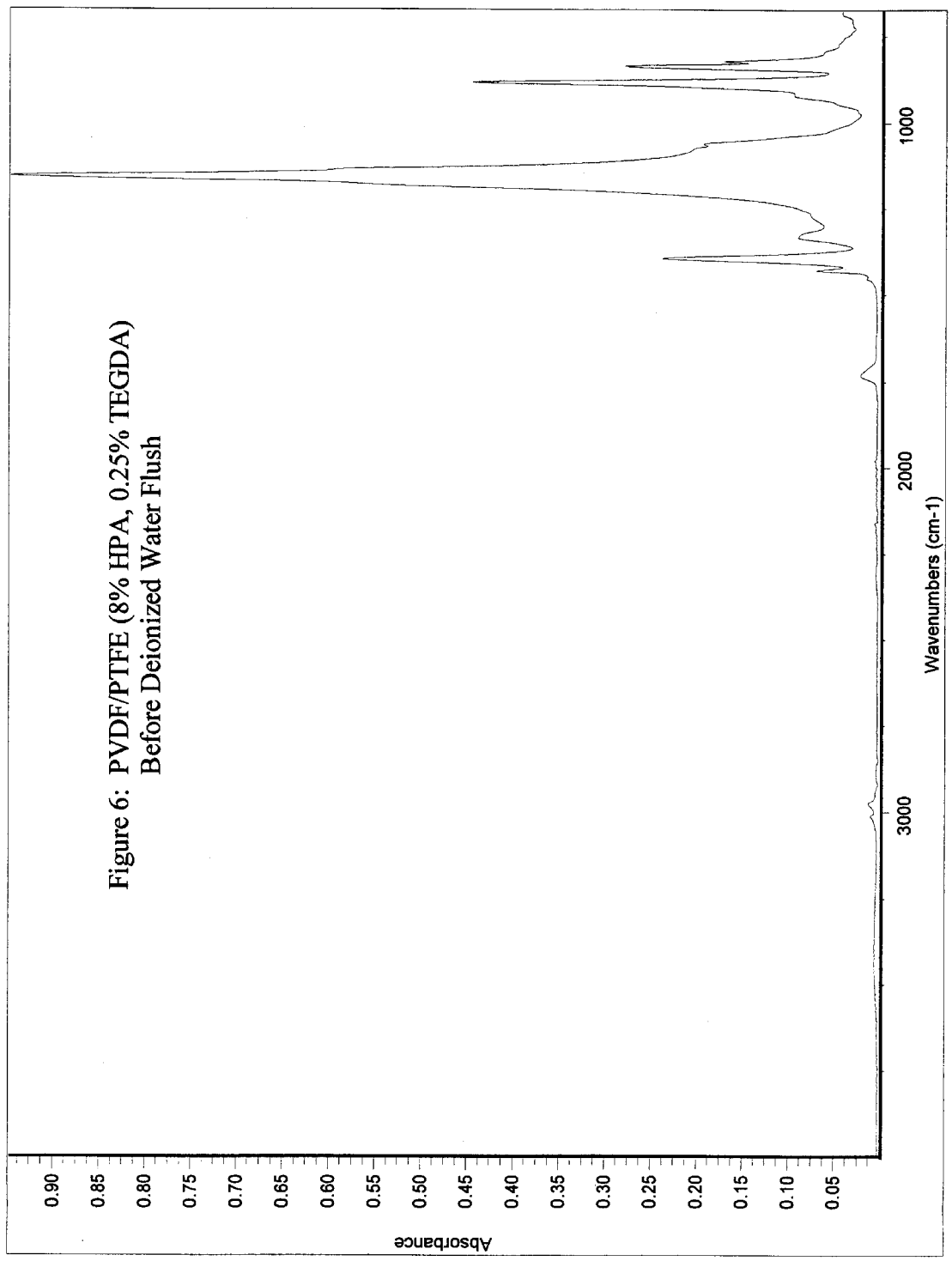
Figure 6: PVDF/PTFE (8% HPA, 0.25% TEGDA) Before Deionized Water Flush

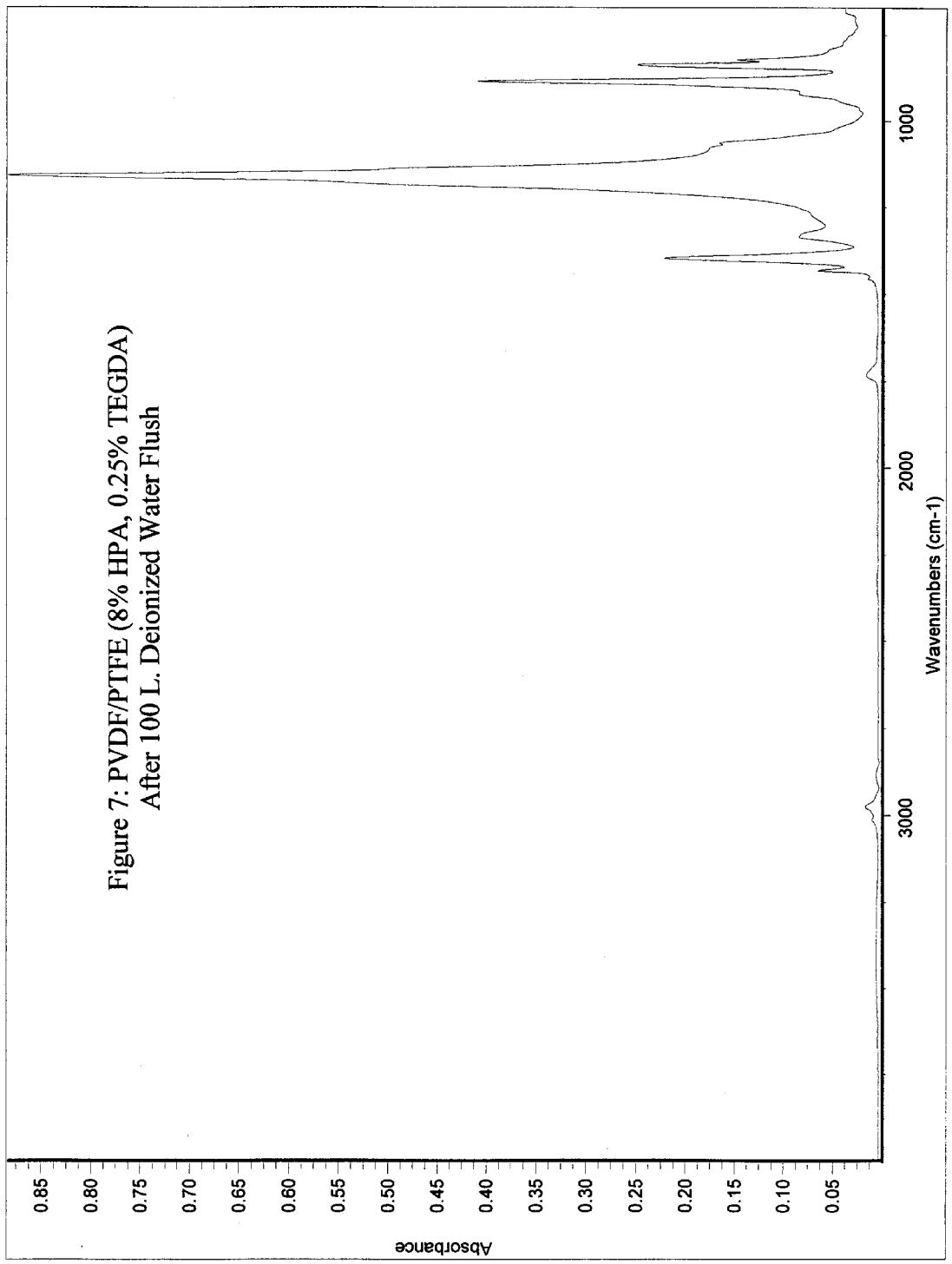
Figure 7: PVDF/PTFE (8% HPA, 0.25% TEGDA) After 100 L. Deionized Water Flush

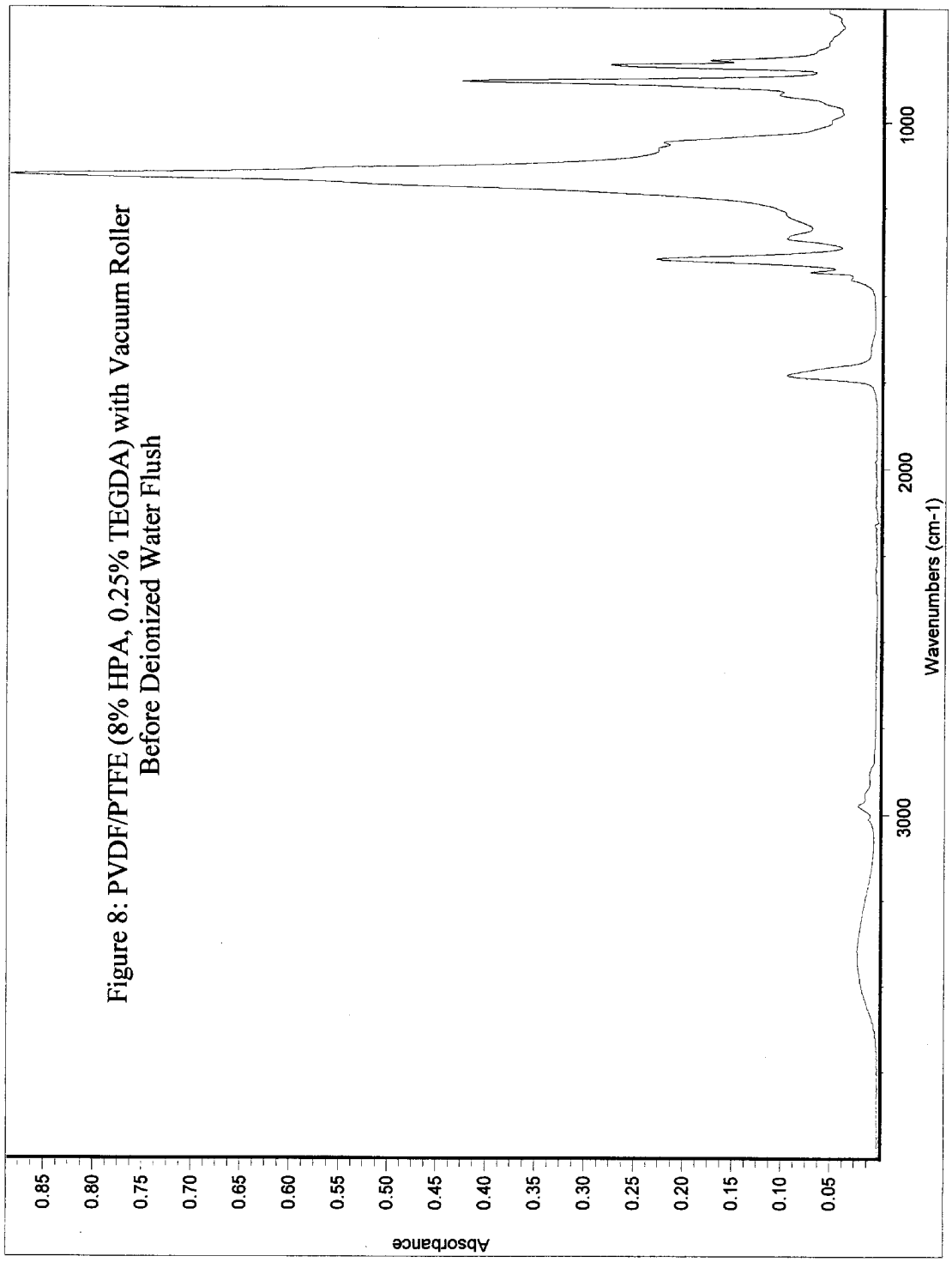

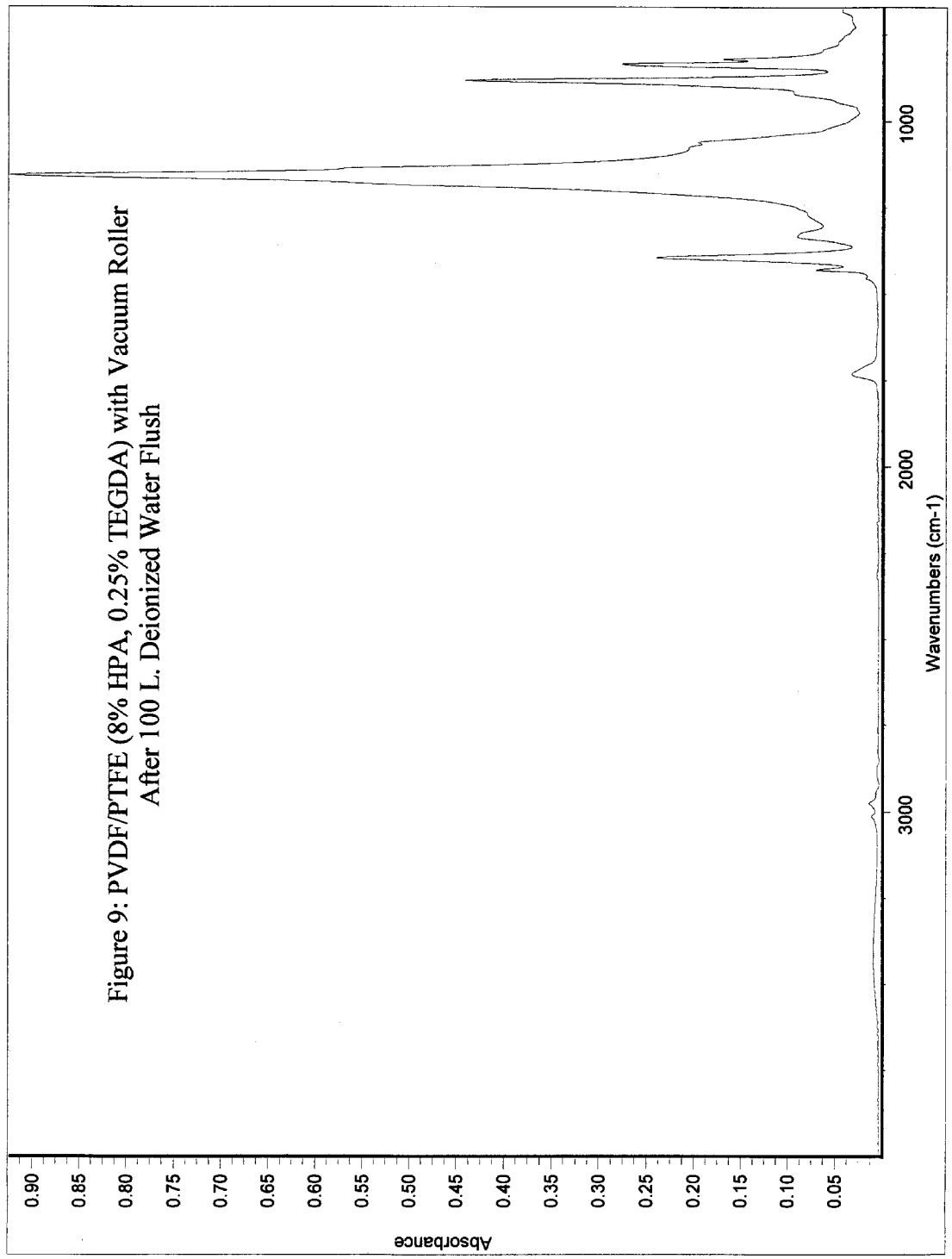

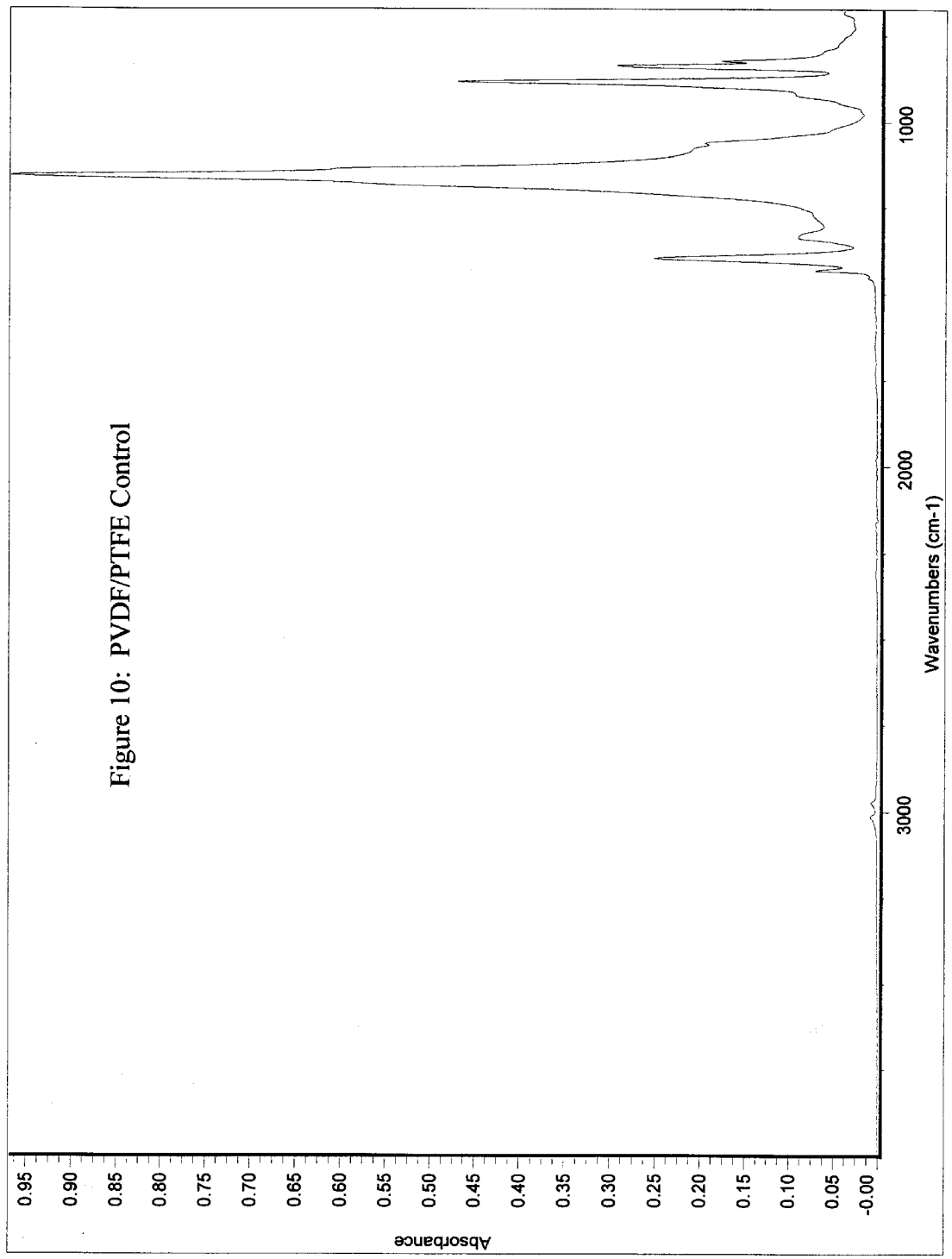
Figure 10: PVDF/PTFE Control

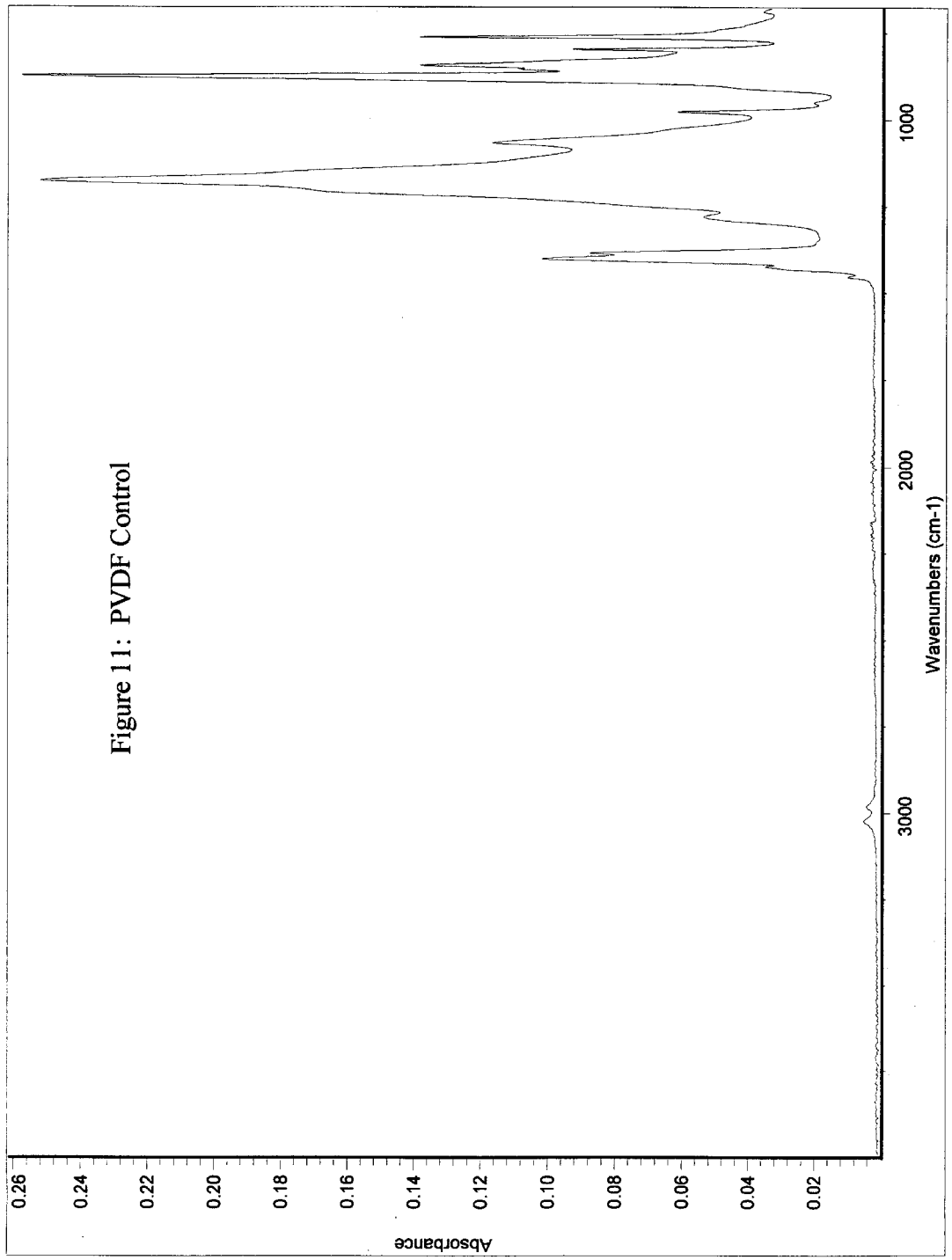
Figure 11: PVDF Control

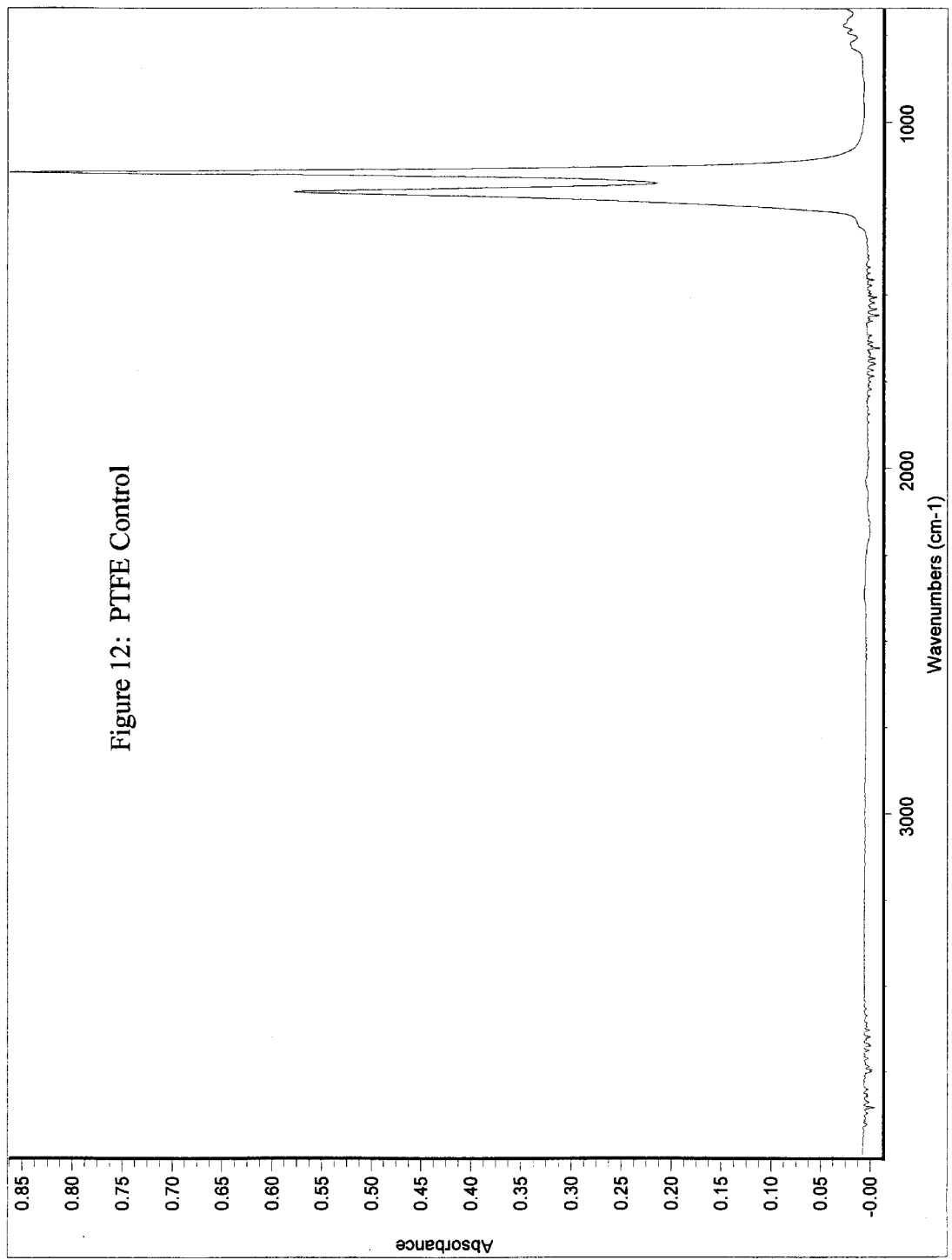
Figure 12: PTFE Control

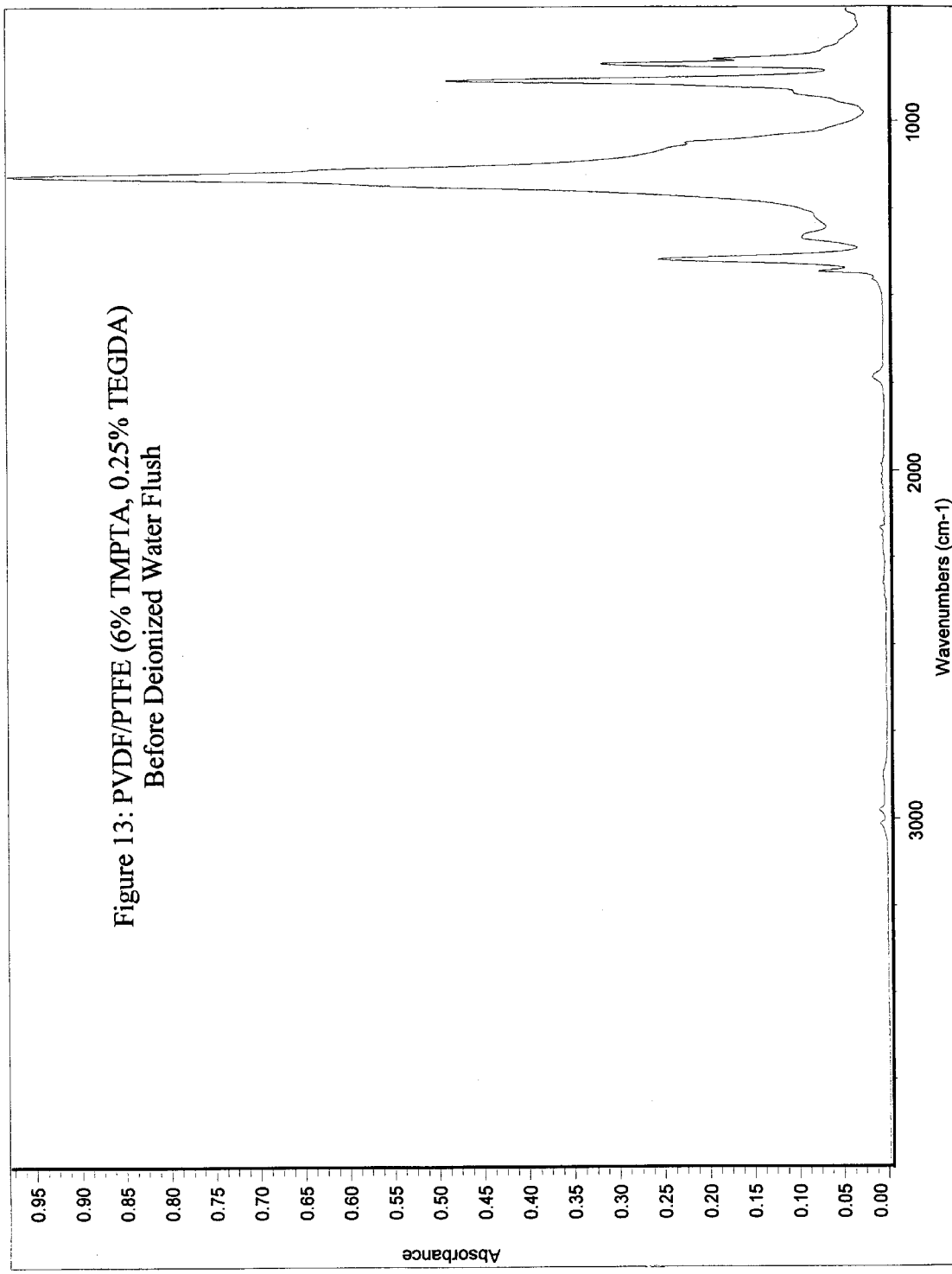
Figure 13: PVDF/PTFE (6% TMPTA, 0.25% TEGDA) Before Deionized Water Flush

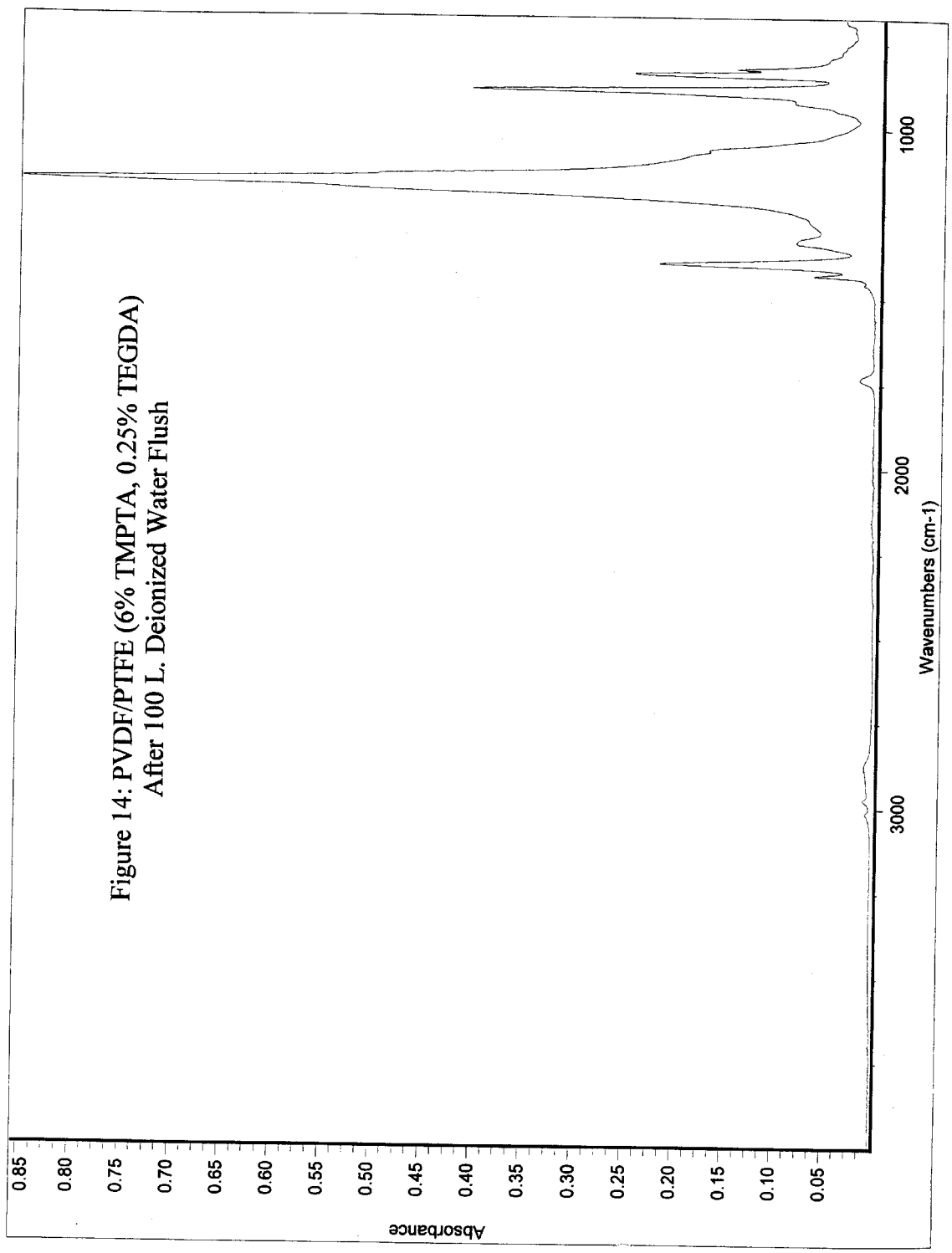

MODIFIED POLYMER HAVING IMPROVED PROPERTIES AND PROCESS FOR MANUFACTURING SAME

BACKGROUND OF THE INVENTION

1. Field of the Invention

The present invention relates in general to new modified porous polymeric materials, useful as membranes in ultrafiltration and microfiltration processes, having advantageous flow characteristics, and a process for preparing such materials.

2. Description of the Related Art

Porous polymeric materials are often used in the filtration industry for filtering gases and liquids. In many applications of filtration technology, it is desirable to utilize a membrane filter, which is mechanically strong, is thermally stable, is relatively inert chemically and is insoluble in most organic solvents. Often, it is desirable that the membrane have surface properties that are radically different from the properties inherent in the polymeric material. Desirable surface properties include wetability and sufficient flow properties.

Porous polymeric materials can be modified by coating with, or grafting to, another polymer which possesses more desirable properties that the first. These types of modifications are often referred to as "surface modifications" or "surface coatings," and are used to add properties to the bulk material that it does not otherwise possess.

Acrylate monomers have been widely used in polymerization reactions on the surface and in the matrices of porous polymeric "substrates" to impart desirable qualities to otherwise less useful filter materials. One example of such a desirable quality is to treat a hydrophobic filter material to render it hydrophilic. Hydrophobic (water-fearing) filter materials will not wet with water, whereas hydrophilic (water-loving) filter materials will, and "wetability" is a desirable quality since a majority of filtration applications encounter aqueous based solutions.

One possible way to impart desirable filter characteristics (such as hydrophilicity) to an acrylate monomer is to cause the chains in the substance to cross-react. Acrylate monomers react with one another based on a "free radical" addition reaction mechanism and traditionally require a reaction initiator to start the chain growth process. These initiators are also referred to as free-radical initiators and are activated using some form of radiant energy.

U.S. Pat. No. 4,618,533 to Steuck discloses the use of acrylate monomers and "thermal" initiators to modify a polymeric membrane material. This patent requires the use of a free radical initiator and lists several compounds that may be employed as such, including persulfate, azo, and organic peroxy compounds. The initiator is a critical component because it forms free radicals when energy is added to the system in the form of heat, ultraviolet light, gamma or electron beam radiation and thus initiates the polymer chain growth process. Different initiators are specific for the type of energy sources used.

U.S. Pat. No. 4,886,836 to Gsell covers methods for "activation" of membrane surfaces. Gsell suggests gamma radiation is preferred as an energy source for activation of a membrane surface, probably because of the high energy level of gamma radiation. Gamma radiation provides such high energy that free radical initiators are not required. In using gamma radiation, free radicals are created everywhere, even in the monomers present. The phenomenon, in which the monomers are attached only to other monomers, is referred to as "homopolymerization." A gamma source, however, is very expensive and requires safety controls, and may not be economically feasible to many. Electron beams may also be used as a radiation source, but the equipment to generate such energy is also very expensive.

U.S. Pat. No. 5,468,390 to Crivello, Belfort, and Yamagishi covers treating polyarylsulfone with acrylates and UV light to reduce the protein binding characteristics of this polymer. "Sensitizers," free radical initiators, are not required because the polymer actually degrades to form free radicals and initiates the polymerization process. The mechanism of cleaving the polysulfone polymer chain is discussed in detail in this patent. The acrylic polymer is bound to the polysulfone membrane substrate by irradiating the sample for 3–5 minutes. Crivello et al. describe using a Southern New England Rayonette Irradiator equipped with sixteen low pressure mercury arc lamps with a broad emission at approximately 251 nm. In this example, the exposure time was relatively lengthy, at 5 minutes. Another experiment used a 450 Watt medium pressure Hanovia Inc mercury arc lamp for 3 minutes. Crivello et al. do not cover other polymer substrates; only polysulfone and polyethersulfone.

SUMMARY OF THE INVENTION

In view of the foregoing, one object of the invention is to provide a method for modifying properties of a polymeric material using monomers without the use of free-radical initiators.

A second object of the invention is to provide a method for modifying properties of a polymeric material without the use of expensive capital equipment.

A third object of the invention is to provide a method for modifying properties of a polymeric material where the exposure time to the ultraviolet light is less than one second.

A fourth object of the invention is to provide a method for modifying properties of a polymeric material where the intensity of ultraviolet light causes surface modification of the polymeric material.

A fifth object of the invention is to provide a method for modifying properties of a polymeric material where the modifying material is bound to the polymeric material.

A sixth object of the invention is to provide a method for modifying properties of a variety of polymeric materials.

A seventh object of the invention is to provide a modified polymeric material having hydrophilic properties and suitable for use as a membrane in a filtration process.

The above objectives are achieved by a process for modifying a porous polymeric material which includes placing the polymeric material in contact with a solution containing at least one type of acrylate monomer and exposing the polymeric material to ultraviolet light such that the intensity of ultraviolet light applied to the polymeric material causes surface modification by polymerization of the acrylate monomer without the use of a free radical initiator.

Using the process of the present invention, several advantages are realized. For example, no free radical initiator is used in the process of the invention. One resulting advantage is that the chemicals used in the invention are less expensive. It is apparent from the mechanism of free radical polymerization that free radicals do indeed form and are required for the polymerization to occur. The free radicals, however, are created from either the membrane and/or the monomer solution. In addition, conventional photo curing processes require photoinitiators, which are used with UV light. Initiators are often the most expensive part of the formulation, even though they are generally used in only small amounts. For example, Sartomer Company (Exton, Pa.) manufactures monomers and photoinitiators used for a variety of coating processes and applications. Sartomer manufactures and sells KIP100F, a photoinitiator compatible with UV light, at a cost of $17/lb, which is 8–9 times the cost of monomers. For example, hydroxypropyl acrylate (HPA), a monomer from Rohm America, costs approximately $2/lb when purchased in drum quantities.

Another advantage to eliminating initiators is that there is one less component in the system. This is a desirable aspect for toxicity considerations for the final product as well as for creating fewer variables in the manufacturing process. Also, once the initiator has been added to a monomer system in conventional methods, the solution has the potential of being less stable and may require special handling.

Another advantage of the present invention is that the process permits less expensive capital investment. The equipment used for the generation of ultraviolet (UV) light is relatively inexpensive, that is, on the order of tens of thousands of dollars as compared to the cost of the equipment needed to generate gamma or electron beam radiation. For example, one piece of equipment that can generate an electron beam was quoted at more than $800,000.

Moreover, the invention provides a faster reaction time. The total exposure time to UV light is approximately 0.5 seconds. By comparison, other UV treatments referenced herein require an exposure of 3–5 minutes.

The process of the invention also allows the modification and use of a variety of polymeric materials including polyvinylidenefluoride (PVDF), polyvinylidenedifluoride/polytetrafluoroethylene (PVDF/PTFE) fluorocopolymer, polytetrafluoroethylene (PTFE), polypropylene (PP), polyethylene (PE) and polyacrylonitrile (PAN) in the form of membranes, films or porous webs.

In addition, in the process of the invention, the acrylic polymer becomes bound to a membrane or other substrate. This is demonstrated by the fact that the hydrophilic treatment does not rinse out of the polymer even when washed with a variety of chemicals.

Furthermore, the resulting modified porous polymeric material exhibits hydrophilic properties rather than its original hydrophobic properties, except for PAN, which actually became more hydrophobic.

These and other objects, features, and advantages of the present invention will become apparent from the following detailed description of the invention when taken in conjunction with the accompanying Figures that illustrate, by way of example, the principles of this invention.

BRIEF DESCRIPTION OF THE FIGURES

The accompanying drawings serve to further elucidate the principles of the present invention. In the drawings:

FIGS. 4–9 are graphs of Fourier Transform Infrared (FTIR) Spectroscopy scans showing the presence of a "carbonyl" peak for samples of various membranes treated with acrylate monomers, where FIG. 4 is an FTIR scan for a PVDF membrane treated with 8% HPA and 0.25% tetraethylene glycol diacrylate (TEGDA), FIG. 5 is an FTIR scan for a PTFE membrane treated with 8% HPA and 0.25% TEGDA, FIG. 6 is an FTIR scan for a PVDF/PTFE fluorocarbon copolymer membrane treated with 8% HPA and 0.25% TEGDA (before flush), FIG. 7 is an FTIR scan for a PVDF/PTFE fluorocarbon copolymer membrane treated with 8% HPA and 0.25% TEGDA (after flush), FIG. 8 is an FTIR scan for a PVDF/PTFE fluorocarbon copolymer membrane treated with 8% HPA and 0.25% TEGDA using a vacuum roller (before flush), and FIG. 9 is an FTIR scan for a PVDF/PTFE membrane treated with 8% HPA and 0.25% TEGDA using a porous tube (after flush);

FIGS. 10–12 are graphs of FTIR scans showing untreated samples, where FIG. 10 is a PVDF/PTFE fluorocarbon copolymer control, FIG. 11 is a PVDF control, and FIG. 12 is a PTFE control; and FIGS. 13 and 14 are graphs of FTIR scans showing fluorocarbon copolymer membranes treated with TMPTA and TEGDA, where FIG. 13 is a PVDF/PTFE membrane treated with 6% TMPTA and 0.25% TEGDA (before flush), and FIG. 14 is a PVDF/PTFE membrane treated with 6% TMPTA and 0.25% TEGDA (after flush).

DETAILED DESCRIPTION OF THE INVENTION

Figure 1:
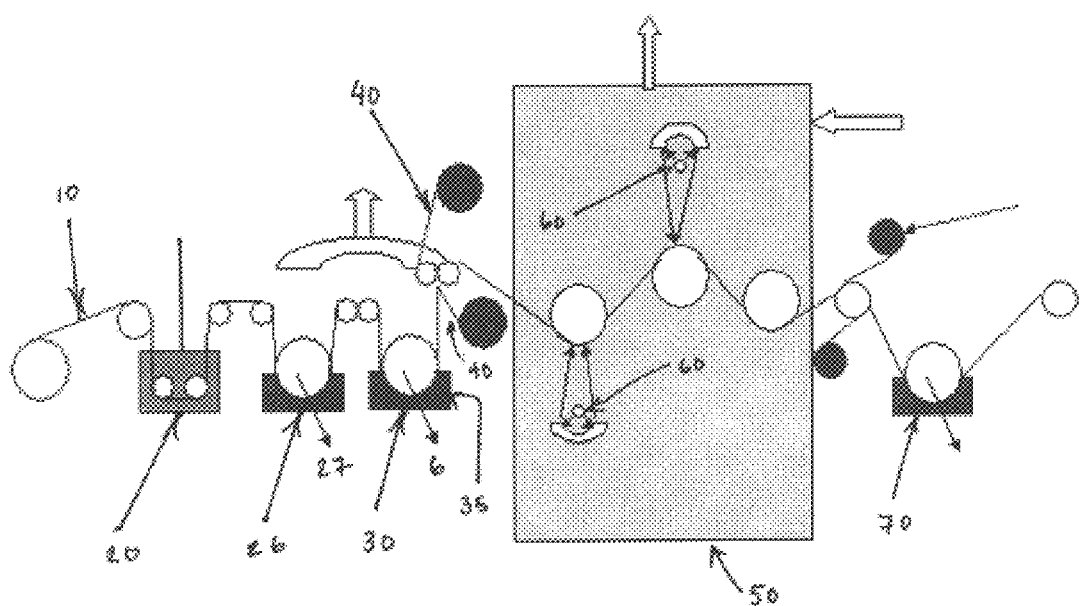
FIG. 1 is a process diagram showing a method for treating a continuous web with acrylate monomers and UV light.

According to one embodiment of the invention, porous polymeric materials are exposed for a period of time to ultraviolet (UV) light in the presence of hydrophilic monomers such as hydroxypropyl acrylate (HPA) and tetraethylene glycol diacrylate (TEGDA) in solution. The growing polymer chain becomes an integral part of the porous polymeric material causing a change from the native hydrophobic state to a modified hydrophilic water-wetting state. Other acrylate monomers besides hydroxypropyl acrylate (HPA) and tetraethylene glycol diacrylate (TEGDA) may be used in this process. For example, trimethylolpropane triacrylate (TMPTA) may be used as a monomer in this process.

Examples of porous polymeric materials that may be modified according to the invention include polyvinylidenefluoride (PVDF), polyvinylidenedifluoride/polytetrafluoroethylene (PVDF/PTFE) fluorocopolymer, polytetrafluoroethylene (PTFE), polyolefin (PO) and polyacrylonitrile (PAN).

The period of irradiation time is about 0.1 to 1 seconds. The ultraviolet lamp used according to the present invention has a UV light that is focused, through use of a parabolic or elliptical reflector. The focused UV light increases intensity (Watts/cm$^2$) and dosage (Joules/cm$^2$) at a focal point.

It is here emphasized that the invention includes not only the process for making the modified porous polymeric materials, but the porous polymeric materials themselves.

The porous polymeric materials may require pre-wetting with a solvent that affects good wetting, where this solvent may not be the optimal solvent for the actual surface treatment. One conventional method for treating a continuous porous polymeric material involves taking a membrane that was previously wet with a first solvent and soaking it in a second solvent. Over time, through diffusion, the first solvent is replaced with the second solvent in the membrane. Disadvantages of this method are that it is a very slow process, it is not suitable for a continuous manufacturing process, and often the first solvent is not completely rinsed away, instead it is diluted to an acceptable concentration.

A second conventional method for treating a continuous porous polymeric material incorporates the use of water bearing tubes. This process involves routing the membrane web over a system of stationary tubes with water flowing out of strategically placed holes in the tubes to float the membrane. The membrane floats on a layer of water coming out of the smaller holes. This is important, since the delicate nature of the membrane makes it susceptible to damage when in contact with a normal roller. The flux of the solvent through the membrane results in rinsing of the membrane web. The pressure across the membrane is based on the following equation:

$$P=T/R$$

where P=the trans-membrane pressure (psi), T=the tension on the web (pounds/linear inch), and R=the radius of the tube (inches).

In a typical case of an unsupported membrane in which the web tension is 0.25 lb/in and the water bearing tube has a 1.5" radius, the pressure becomes:

$$P=0.25/1.5=0.167 \text{ psi}$$

If the membrane travels over a water bearing tube at a speed of 5 ft/minute, the membrane is exposed to this pressure for a period of time equal to: 1/2 the circumference/(5 ft/min) or 4.7 inches/min=4.7 seconds. Thus, a typical 0.1 $\mu$m membrane traveling over a water bearing tube is exposed to a water flow rate of 0.25 cm$^3$/min-cm$^2$-psi for a period of 4.7 seconds. The resulting volume flushed through the membrane on one pass over a single water bearing tube is:

Volume flushed/cm$^2$=Flow rate×minutes×psi

Volume=0.25 cm$^3$/min-psi-cm$^2$×(4.7/60 minutes)×0.167 psi

Volume=0.0033 cm$^3$/cm$^2$

A preferred process for treating a continuous porous polymeric material web, membrane or other material is depicted in FIG. 1. This preferred process involves the use of a porous roller over which a membrane web travels. The driven roller is connected to a vacuum source and holds the membrane web tightly as it travels over the rotating roller, also described as a vacuum roller. The roller is dipped into a bath containing a second solvent that is to be exchanged with the first solvent existing in the membrane. Since the membrane contains very small pores, there is no flow of air through the membrane when in contact with the vacuum roller due to capillary forces holding liquid in the pores. As the membrane is submerged in the liquid, however, water flows freely through the membrane. The vacuum is the driving force and the trans-membrane differential pressure at 28" Hg is approximately equal to 14 psig. This is approximately 82 times the pressure of achieved by the water bearing tube method discussed above. Using the same speed and amount of wrap as in the previous discussion, one vacuum roller can accomplish what 82 water bearing tubes can. The volume of liquid flushed through a typical 0.1 $\mu$m membrane in one pass at 5 ft/minute is as follows:

Volume flushed/cm$^2$=Flow rate×minutes×psi

Volume=0.25 cm$^3$/min-psi-cm$^2$×(4.7/60 minutes)×14 psi

Volume=0.274 cm$^3$/cm$^2$

The use of vacuum rollers allows faster flushing than conventional methods, better process control, and a smaller volume of chemicals. The use of vacuum rollers in the process of modifying porous membranes is shown in detail below.

The membrane web 10 travels through a wetting tank 20 containing a liquid 25 capable of wetting the membrane 10. Several solutions have been successfully used for this wetting bath such as methanol, ethanol and isopropyl alcohol. These solutions work equally well when diluted in water up to approximately 50% by volume.

The membrane web 10 then travels into a second bath 26 containing water. The purpose of this bath is to rinse out the alcohol. The inventors have discovered that alcohols have a negative effect on the polymerization process. That is, the treatment is imperfect or may not be permanent if alcohols are present. The water is preferably applied using a porous vacuum roller 27 over which the membrane 10 travels. As described above, this enables extremely efficient flushing in a short period of time.

The membrane 10 then travels into a third bath 30 containing an aqueous solution of the monomers 35.

It is not the intention of the inventor to limit this procedure to "aqueous solutions" or even "solutions" for that matter. The application of the monomers may also work with suspensions, and may not need to be aqueous based. The preferred method is to flush the monomer solution 35 through the membrane 10 using vacuum. This allows the membrane 10 to be flushed without diluting the monomer solution 35.

The solution 35 is preferably applied using a porous vacuum roller 6 over which the membrane 10 travels. Using the example of a porous vacuum roller, the amount of liquid 35 flushed through the membrane 10 is dependent on the membrane web 10 speed, the amount of vacuum applied, the contact time and the liquid flow rate through the membrane 10. The vacuum roller may be made from any suitable material that is compatible with the solution 35 used.

The monomer solutions in the examples described below do not wet all types of membranes spontaneously, therefore in some cases a first bath 20 containing alcohol solution 25 having a sufficiently low surface tension is used to readily wet the membrane 10. However, the monomer solution 35 could conceivably have a sufficiently low surface tension to wet the membrane 10 and eliminate the need for a "wetting bath" 20 and a "rinse bath" 26, as long as the components in the monomer-containing-liquid 35 do not adversely affect the polymerization process.

Following the application of the monomer solution 35, the membrane web 10 is then sandwiched between two layers of dense 200 $\mu$m thick polyethylene film 40 and carried into a chamber 50 containing at least one UV light source 60. The purpose of the polyethylene film 40 is to keep oxygen away from the membrane web 10.

Another way to eliminate oxygen from the reaction is to purge the UV light chamber 50 with nitrogen or another inert gas. Because oxygen interferes with the polymerization process, it must be eliminated or at least minimized both in the chamber 50 and in the monomer solution 35 as well. This may be accomplished by bubbling nitrogen gas through the monomer solution 35.

A preferred laboratory UV light source is a Fusion UV System Model F300S-6 employing "D," "H" or "V" bulbs with a width of 6 inches. Larger production systems are available that contain wider bulbs that can be positioned to span across a wider membrane web. These systems strategically place 10 inch bulbs to optimize the resulting UV light output and web coverage. Bulbs with different wattage outputs are also available and may be used with varying results. For production purposes Model F450T-40 60 is suitable to irradiate a 40" membrane web on both surfaces.

The membrane web 10 containing monomer solution 35 is exposed to the UV light source 60 at a focal point for about 0.5 seconds on each side. The polyethylene film 40 is removed from both sides of the web 10, and the membrane web 10 is then washed with deionized water 70, followed by drying. Here also, a vacuum roller works best.

Experiments were conducted to confirm that the porous polymeric materials may be effectively modified using UV light without the use of a free radical initiator, and also to demonstrate that the modified porous polymeric materials exhibited hydrophilic properties.

UV light has enough energy to break chemical bonds and create free radicals. It is well known that the energy in light is proportional to wavelength according to the equation:

$$E = hc/\lambda \quad (1)$$

Where: $E$ = energy
$\lambda$ is the wavelength of light
$h$ = Planck's Constant = $9.54 \times 10^{-14}$ kcal-sec/mole
$c$ = velocity of light $3.00 \times 10^8$ m/s
In the case of UV light having a wavelength of 200 nm, $$E = (9.54 \times 10^{-14} \text{ kcal-sec/mol}) \times (3.00 \times 10^8 \text{ m/sec}) \times 1/(200 \times 10^{-9} \text{ m}) = 143 \text{ kcal/mol}.$$

By similar calculation, the energy of radiation of wavelength 400 nm is found to be 71.5 kcal/mol.

These energies are of the same magnitude of typical bond dissociation energies of carbon-carbon bonds, carbon-hydrogen bonds and carbon-fluorine bonds found in the monomers and organic polymers used as substrates in the following examples. Many chemical bonds of this type have bond dissociation energies of 80–120 kcal/mol. This indicates that bond cleavage and creation of free radicals is thermodynamically feasible using UV light.

Similarly, the calculated energy of gamma radiation, at a wavelength as small as $5 \times 10^{-13}$ meters, is $5.7 \times 10^7$ kcal/mol. Approximately five orders of magnitude (100,000 times) more than what is required to break chemical bonds. This is the type of radiation recommended in U.S. Pat. No. 4,886,836 for acrylate polymerization occurring without reaction initiators.

The intensity of the UV light is important in the process of modifying porous polymeric material. The intensity, or irradiance, of the energy delivered by a UV lamp is the radiant energy that arrives per unit area at any moment during exposure, and is measured in watts/cm$^2$. The greater the irradiance, the greater the radiant power delivered at any depth within the sample being treated.

"Dose" refers to the time-integral of irradiance or the energy delivered to the surface during a specific period of time, which is measured in Joules/cm$^2$, where 1 watt/cm$^2 \times 1$ sec=1 joule/cm$^2$. It follows that the dose is directly proportional to the intensity and exposure time. That is, the higher the intensity, the less time required to deliver the same dose.

Ultraviolet light intensity is effected by the diameter of the lamp and the efficacy of the reflector. The data in Table 1A, below, illustrates the high energy achieved by a system employing a 9 mm diameter bulb and an elliptical reflector.

An experiment was run in which the UV light intensity was measured at the focal point of a Fusion UV Systems light, Model LC-6 Benchtop Conveyer, and compared to manufacturer's listed data for a Rayonet Photochemical Chamber Reactor Model RPR-100. The results listed in Table 1A show that there is indeed a significant difference in the intensity of the UV light source for these different UV light systems, especially in the 280–390 nanometer wavelength range. The UVA and UVB wavelength ranges are over 10,000 times higher in intensity for the Fusion system compared to a Rayonet system. The UVC wavelength range is about five times higher and the UVV wavelength range is about 275 times higher intensity for the Fusion system.

TABLE 1A

Intensity of UV light for Fusion and Rayonet

| Wave Length Range | Wave Length (nanometers) | Intensity (watts/cm$^2$) Fusion* | Intensity (watts/cm$^2$) Rayonet** | Intensity Ratio Fusion/ Rayonet |
|---|---|---|---|---|
| UVV | 395–445 | 2.304 | 0.00838 | 274 |
| UVA | 320–390 | 4.523 | 0.00035 | 12,922 |
| UVB | 280–320 | 1.350 | 0.00012 | 11,250 |
| UVC | 250–260 | 0.097 | 0.02 | 4.6 |

*Fusion electrodeless 120 w/cm "D" bulb (Measured with UV Power Puck ™ (Electronic Instrumentation and Technology) at the focal point, ~4 inches from lamp.
**Rayonet RPR-2537 Angstrom Lamp (Average, 1.5 inches from lamp, from Rayonet literature. This distance had the highest reported values.)

Another important factor related to UV light energy is that the depth of penetration of light is proportional to the intensity, not the dose. Table 1B, below, shows the percent penetration through a membrane for both D and H bulbs. An increase in the exposure time has little effect on the depth of penetration. This applies here to the depth of the monomer solution in the membrane or web. This means that a low intensity light cannot achieve the same depth of penetration as a high intensity light, regardless of the exposure time. Since the bulb diameter has a direct effect on the intensity of the focused energy, a smaller diameter bulb enables the energy to be focused to a smaller area resulting in a higher intensity dose than a larger diameter bulb.

TABLE 1B

Penetration of UV Light

| Wave Length Range | Wave Length (nanometers) | Intensity (watts/cm$^2$) without membrane "D" bulb 110 Volts | Intensity (watts/cm$^2$) with membrane* "D" bulb 110 Volts | % Penetration through membrane | Intensity (watts/cm$^2$) without membrane "H" bulb 110 Volts | Intensity (watts/cm$^2$) with membrane* "H" bulb 110 Volts | % Penetration through membrane |
|---|---|---|---|---|---|---|---|
| UVV | 395–445 | 1.943 | 1.281 | 65.9 | 0.917 | 0.614 | 67.0 |
| UVA | 320–390 | 3.329 | 2.051 | 61.6 | 1.36 | 0.739 | 54.3 |
| UVB | 280–320 | 0.927 | 0.439 | 47.4 | 1.15 | 0.534 | 46.4 |
| UVC | 250–260 | 0.082 | 0.031 | 37.8 | 0.212 | 0.074 | 34.9 |

*Fluorocopolymer membrane.

The focal point has the same cross-sectional area as the bulb when using the elliptical reflector. The actual exposure time for the experiments using a 120 watt/cm D-bulb at 5 ft/min, and using a focal point with a diameter of 9 mm is:

9 mm/25.4 mm×1 second/inch=0.35 seconds.

EXAMPLES 1–11

Several different porous polymeric materials were exposed to a solution containing one or two different commercially available acrylate monomers. Hydroxypropyl acrylate (HPA) was purchased from Scientific Polymer Products, and tetraethylene glycol diacrylate (TEGDA) and trimethylolpropane triacrylate (TMPTA) were purchased from Sartomer.

Deionized water was prepared by bubbling with $N_2$ gas for approximately 5 minutes. HPA, TEGDA, and/or TMPTA were added to the water according to the concentrations specified in Tables 2, 3, 4, and 5. Hydrophobic porous polymeric membrane samples were dipped in ethanol, transferred to a 47 mm filter funnel equipped with vacuum and flushed with approximately 2 mL of the appropriate monomer solution. The sample disks were then sandwiched between two layers of 200 µm thick polyethylene film, placed on the conveyer belt of a Fusion UV Systems' Model F300S-6 Ultraviolet Curing System, with a "D" bulb, and run at a belt speed of 5 ft/minute. The actual time of UV exposure at the focal point was about 0.35 seconds. The composite films were turned over and run through again. The sample disks were then placed in a bath of DI water with continuous water replacement for a period of 10 minutes. The sample disks were dried at 40° C. for >18 hours or at 80° C. for 1 hour, and then tested for wetting and water flux. The wetting was measured by placing the disk on the surface of water and recording the time to visually become wet as evidenced by a color change. During this wetting test, it was not apparent that the PTFE and polyolefin membranes became wet when placed in water. (A small amount of pressure was used to demonstrate wetability of these filters in a 25 mm diameter filter holder with a water filled syringe). For all the samples, the water flow rate test was performed under 20" vacuum in a filter funnel and the results standardized to cubic centimeters/minute-$cm^2$-psig.

A second test was performed to demonstrate that surface modification was resistant to a water flushing test. In this test, 25 mm diameter membrane samples were flushed with 100 liters of DI water followed by drying as previously described. The membrane samples were tested again to determine wetting and water flux.

COMPARATIVE EXAMPLES 1–3

The controls for this experiment included membrane samples that were treated with monomer but not exposed to UV light. These samples were rinsed with DI water after the monomer flush step and dried as the others.

Tables 2, 3 and 4 demonstrate the effect of increasing the concentrations of HPA in the monomer solution. The important parameters to consider are the time-to-wet and also the water flow rate. A larger water flow rate. is desirable. In the case of wetting-time, however, a shorter time is more desirable than a longer time. These two test parameters are related since a "non-wetable" membrane will not permit liquid flow.

Examples 1–11 show a favorable decrease in wetting time with increasing HPA concentration. This result demonstrates that more HPA results in faster wetting membrane. Comparative Examples 1–3 that were not exposed to UV light (those having "0" UV time) resulted in "no wetting." This can be seen in Table 4 in which the HPA was the highest concentration for this series of experiments at 10%. The results demonstrate that the HPA treatment is not effective in making the membranes hydrophilic when used without the UV light treatment.

TABLE 2

Wetting and Flow Results for 6% HPA and 0.25% TEGDA

| Example | Type of membrane used | UV TIME (sec) | Time to wet (sec) | Pre-Flush Water flow rate (cc/min −) $cm^2$ − psig) | Post Flush Time to wet (sec) | Post Flush Water flow rate (cc/min −) $cm^2$ − psig) |
|---|---|---|---|---|---|---|
| Ex. 1 | PTIFC | 0.35 | 90 | 0.75 | 150 | 0.43 |
| Ex. 2 | PVDF | 0.35 | 30 | 0.85 | 60 | 0.76 |
| Ex. 3 | PTFE | 0.35 | Not apparent | 0.11 | Not apparent | 1.22 |
| Ex. 4 | Polyolefin, nonwoven | 0.35 | Not apparent | 0.78 | Not apparent | 0.79 |
| Ex. 5 | PO | 0.35 | Not apparent | 1.14 | Not apparent | 0.53 |

PTIFC = PVDF/PTFE, PVDF - hydrophobic Millipore, PTFE - Gore

TABLE 3

Wetting and Flow Results for 8% HPA and 0.25% TEGDA

| Example | Type of membrane used | UV TIME (sec) | Time to wet (sec) | Pre-Flush Water flow rate (cc/min −) $cm^2$ − psig) | Post Flush Time to wet (sec) | Post Flush Water flow rate (cc/min −) $cm^2$ − psig) |
|---|---|---|---|---|---|---|
| Ex. 6 | PTIFC | 0.35 | 2.4 | 0.66 | 78 | 0.59 |
| Ex. 7 | PYDF | 0.35 | 15 | 0.81 | 30 | 0.85 |
| Ex. 8 | PTFE | 0.35 | Not apparent | 0.13 | Not apparent | 0.37 |

TABLE 4

Wetting and Flow Results for 10% HPA and 0.25% TEGDA

| Example/ Comparative Example | Type of membrane used | UV TIME (sec) | Time to wet (sec) | Pre Flush Water flow rate (cc/min – cm² – psig) | Post Flush Time to wet (sec) | Post Flush Water flow rate (cc/min – cm2-psig) |
|---|---|---|---|---|---|---|
| Ex. 9 | PTIFC | 0.35 | 2 | 0.68 | 10 | 0.74 |
| C. Ex. 1 | PTIFC | 0 | Not apparent | 0 | Not apparent | 0 |
| Ex. 10 | PVDF | 0.35 | 14 | 0.75 | 72 | 0.78 |
| C. Ex. 2 | PVDF | 0 | Not apparent | 0 | Not apparent | 0 |
| Ex. 11 | PTFE | 0.35 | Not apparent | 0.13 | Not apparent | 0.37 |
| C. Ex. 3 | PTFE | 0 | Not apparent | 0 | Not apparent | 0 |

TABLE 5

Wetting and Flow Rate Results for Fluorocarbon Membranes Treated with Several Different Combinations of Monomers

| Example | Monomer Used (% in water) | Type of membrane used | UV TIME (sec) | Time to wet (sec) | Pre-Flush Water flow rate (cc/min – cm² – psig) | Post Flush Time to wet (sec) | Post Flush Water flow rate (cc/min – cm² – psig) |
|---|---|---|---|---|---|---|---|
| Ex. 12 | 8% HPA/ 0.25% TEGDA | PVDF/PTFE | 0.35 | 30 | 0.45 | 33 | 0.47 |
| Ex. 13 | 6% TMPTA | PVDF/PTFE | 0.35 | 8 | 0.36 | 22 | 0.36 |
| Ex. 14 | 6% TMPTA/ 0.25% TEGDA | PVDF/PTFE | 0.35 | 4 | 0.25 | 10 | 0.33 |
| Ex. 15 | 8% HPA/ 0.25% TMPTA | PVDF/PTFE | 0.35 | 10 | 0.65 | 3 | 0.66 |

The data in Table 5 demonstrate that different monomers may be used to impart wetting characteristics to membranes. In this experiment, a relatively hydrophobic membrane material was used for each example. Three examples of monomers are shown, including HPA, TMPTA, and TEGDA. In example 12, HPA was used as the primary monomer with TEGDA as a multifunctional cross-linker. In example 13, TMPTA was used, and the results demonstrate that a multifunctional monomer may be used alone. In example 14, TMPTA was used as the primary monomer with TEGDA as a cross-linker. In example 15, HPA was used as the primary monomer with TMPTA as the cross linker. In all cases the resulting membrane was hydrophilic, had acceptable water flow rates and was resistant to flushing with deionized water.

In the examples, except example 15, there is an increase in wetting-time after the 100-liter flush. Although this increase indicates that modification of the polymer is less effective after the flush, the data also indicates that the modification is still effective enough to impart wetting in ~20 seconds, as in the case of fluoropolymer membrane in examples 9, 13, 14, and 15.

The membrane substrate samples used for these experiments were not optimized for maximum water flow rate, therefore the magnitude of the flow rates is not particularly important as much as their difference when comparing the post flush to the pre-flush values. After the 100-liter water flush, the membranes may have become partially plugged since no attempts were made to keeping the flush equipment sterile.

One notable observation in Table 2 is the water flow rate of the PTFE membrane after the water flush. The water flow rate increased from 0.11 to 1.22 cc/min-cm²-psi. This result shows that the treated membrane became hydrophilic enough to achieve its maximum possible water flow rate even though visible signs of wetting were not apparent. This observation was not as pronounced for the PTFE samples exposed to the 8 and 10% HPA solutions.

The modified PTFE and PO membrane samples and the polyolefin non-woven media did not wet visually and consequently received a "not apparent" designation. However, when flushed with a water-filled syringe, water flow was achieved for the PTFE membrane. The PO membrane and PO non-woven media samples became visually wet following the vacuum water flow rate procedure. None of the untreated PO, PTFE and PO non-woven samples are wetable under vacuum flow conditions. Although there was no apparent signs of wetting in the wetting test, the treated PTFE, PO membranes and PO non-woven media still allowed water flow under the influence of pressure and was therefore more hydrophilic than the unmodified comparative samples.

Tetraethylene glycol diacrylate (TEGDA) is shown to have a positive effect on the "time-to-wet" parameter when low concentrations of HPA are used. It also has been demonstrated in experiments that at 10% HPA concentration, the membrane wets to an acceptable degree without the use of TEGDA (i.e. 90 sec, 0.68 cc/min-cm²-psig). Example 15 shows that TMPTA may be used instead of TEGDA and example 13 shows that TEGDA may be omitted altogether.

In the foregoing examples, membrane wetting has been the most obvious indication that the acrylate monomer/UV treatment is permanent, even after flushing with copious amounts of water and drying. This is a test that can be readily observed on a macroscopic scale and is valid since one pertinent use for this discovery is to make otherwise hydrophobic membranes and filters more hydrophilic. Another test that confirms the presence of the acrylic polymer is Fourier Transform Infrared (FTIR) Spectroscopy. When the acrylate/UV treated substrates are tested using FTIR spectroscopy, the characteristic peak of the carbonyl functional group can be readily seen at slightly above 1700 wave numbers. This peak is not present on untreated samples. The peak is still present on membrane scans after flushing with water indicating that the polymerized acrylic is still present on the surface of the membrane. In FIGS. 4–9, FTIR scans for various treated polymers including PTFE, PVDF, and a fluoropolymer membrane show the presence of the characteristic carbonyl peak of the acrylic polymer. These may be compared with FIGS. 10, 11, and 12, which show the untreated materials. In FIGS. 10, 11, and 12 no carbonyl peak is present at ~1710 wave numbers. FIGS. 13 and 14 show another fluoropolymer membrane treated with TMPTA. Here again, the characteristic carbonyl peak is present showing the presence of the treatment on the membrane surface.

Figure 2:
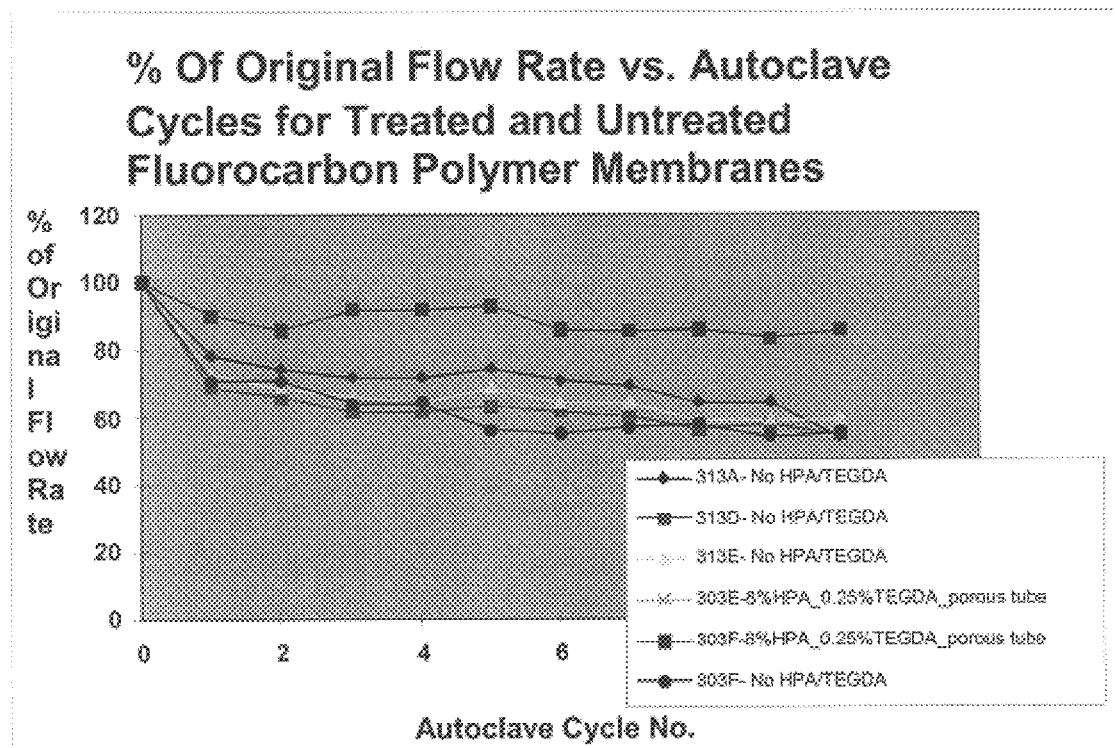
FIG. 2 is a graph plotting the percentage of original flow rates against autoclave cycles for treated and untreated fluorocarbon copolymer membranes.

After exposure of fluorocarbon copolymer membrane samples with HPA, TEGDA, and UV light, the membranes' physical properties were enhanced. Membrane samples were tested for physical dimensions and performance properties before and after autoclaving in a Brinkman 2540E table top autoclave at 125° C. The results indicate that modified membranes survive autoclave conditions better than unmodified membranes, as evidenced by less shrinkage and higher water flow rates. Membrane strength and temperature stability are critical properties since membranes are often subjected to autoclave conditions during sterilization. FIG. 2 clearly shows that the samples that were modified with the acrylate/UV system demonstrated less of a reduction in water flow rate.

Figure 3:
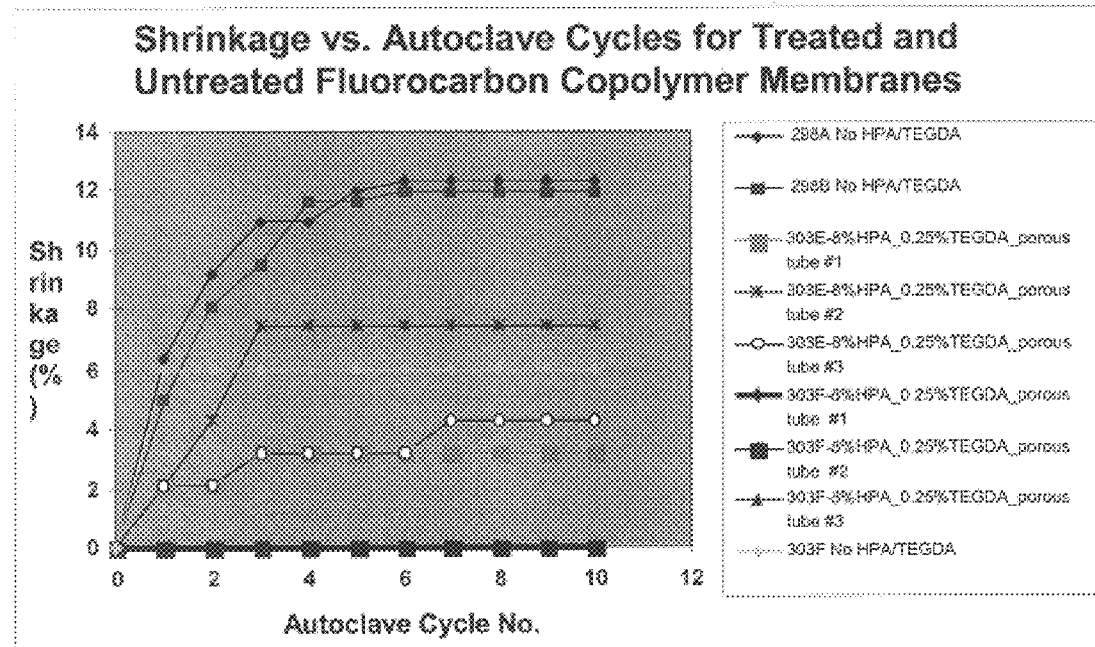
FIG. 3 is a graph plotting the percentage of shrinkage against autoclave cycles for treated and untreated fluorocarbon copolymer membranes.

The observed water flow rate reduction of the unmodified membrane is a result of shrinkage, which is more pronounced on the unmodified samples. This is depicted in FIG. 3. It is clear that the acrylate/UV treatment imparts desirable physical properties to the Fluorocarbon-Copolymer membrane used in this example.

The foregoing detailed description of the embodiments of the invention has been provided for the purposes of illustration and description. It is not intended to be exhaustive or to limit the invention to the precise embodiments disclosed. The embodiments were chosen and described to best explain the principles of the invention and its practical application, thereby enabling others skilled in the art to understand the invention. While the invention has been described in connection with what is presently considered to be the most practical and preferred embodiments, it is understood that the invention is not limited to the disclosed embodiments. To the contrary, this invention is intended to cover various modifications and equivalent arrangements included within the spirit and scope of the appended claims.

What is claimed is:

1. A process for modifying a porous polymeric material having a surface, said process comprising:
   placing the polymeric material in contact with a fluid containing at least one type of acrylate monomer; and
   applying ultraviolet light to said surface of said polymeric material at sufficient intensity to cause modification of said surface by the at least one type of acrylate monomer without the use of a free radical initiator.

2. The process according to claim 1, wherein the fluid is flushed through the membrane.

3. The process according to claim 2, wherein the fluid is flushed using vacuum rollers.

4. The process according to claim 1, wherein the porous polymeric material is selected from the group consisting of polyvinylidenefluoride (PVDF), polyvinylidenedifluoride/polytetrafluoroethylene (PVDF/PTFE) fluorocopolymer, polytetrafluoroethylene (PTFE), polyolefin (PO), and polyacrylonitrile (PAN).

5. The process according to claim 1, wherein the fluid comprises at least hydroxypropyl acrylate (HPA).

6. The process according to claim 1, wherein the fluid comprises at least tetraethylene glycol diacrylate (TEGDA).

7. The process according to claim 1, wherein the fluid comprises at least trimethylolpropane triacrylate (TMPTA).

8. The process according to claim 1, wherein the fluid comprises 2–12% hydroxypropyl acrylate (HPA).

9. The process according to claim 8, wherein the fluid comprises 7–9% hydroxypropyl acrylate (HPA).

10. The process according to claim 8, wherein the fluid comprises 8% hydroxypropyl acrylate (HPA).

11. The process according to claim 8, wherein the fluid comprises 10% hydroxypropyl acrylate (HPA).

12. The process according to claim 1, wherein the fluid comprises about 0.25% tetraethylene glycol diacrylate (TEGDA).

13. The process according to claim 1, wherein the fluid comprises 0.25–6% trimethylolpropane triacrylate (TMPTA).

14. The process according to claim 1, wherein the fluid further comprises a cross-linking agent.

15. The process according to claim 1, wherein the polymeric material is exposed to ultraviolet light for 0.025–2.5 seconds.

16. The process according to claim 15, wherein the polymeric material is exposed to ultraviolet light for less than one second.

17. The process according to claim 15, wherein the polymeric material is exposed to ultraviolet light for about 0.35 seconds.

18. The process according to claim 1, wherein the intensity of UV light having wavelengths of 395–445 nm is 0.5–10 watts/cm$^2$.

19. The process according to claim 1, wherein the intensity of UV light having wavelengths of 320–390 nm is 0.5–10 watt/cm$^2$.

20. The process according to claim 1, wherein the intensity of UV light having wavelengths of 280–320 nm is 0.5–10 watts/cm$^2$.

21. The process according to claim 1, wherein the intensity of UV light having wavelengths of 250–260 nm is 0.05–1.0 watts/cm$^2$.

22. The process according to claim 1, wherein applying said ultraviolet light causes the at least one type of acrylate monomer to bond to the polymeric material.

23. The process according to claim 1, wherein the ultraviolet light penetrates at least 30% of the polymeric material.

24. The process according to claim 1, wherein the ultraviolet light penetrates at least 50% of the polymeric material.

25. The process according to claim 1, wherein the ultraviolet light penetrates at least 60% of the polymeric material.

26. A modified porous polymeric material having hydrophilic properties, comprising:
   a porous polymeric material, with a surface modified by at least one type of acrylate monomer such that the porous polymeric material is hydrophilic;

wherein the porous polymeric material is modified by placing the polymeric material in contact with a fluid containing at least one type of acrylate monomer and applying ultraviolet light to said surface of said polymeric material at sufficient intensity to cause modification of said surface by the at least one type of acrylate monomer without the use of a free radical initiator.

27. The modified porous polymeric material of claim 26, wherein the fluid is flushed through the membrane.

28. The modified porous polymeric material of claim 26, wherein the fluid is flushed using vacuum rollers.

29. The modified porous polymeric material of claim 26, wherein the porous polymeric material is selected from the group consisting of polyvinylidenefluoride (PVDF), polyvinylidenedifluoride /polytetrafluoroethylene (PVDF/PTFE) fluorocopolymer, polytetrafluoroethylene (PTFE), polyolefin (PO) and polyacrylonitrile (PAN).

30. The modified porous polymeric material of claim 26, wherein the acrylate monomer comprises at least hydroxypropyl acrylate (HPA).

31. The modified porous polymeric material of claim 26, wherein the fluid comprises at least tetraethylene glycol diacrylate (TEGDA).

32. The modified porous polymeric material of claim 30, wherein the fluid comprises between 2–12% hydroxypropyl acrylate (HPA).

33. The modified porous polymeric material of claim 32, wherein the fluid comprises about 7–9% hydroxypropyl acrylate (HPA).

34. The modified porous polymeric material of claim 33, wherein the fluid comprises about 8% hydroxypropyl acrylate (HPA).

35. The process according to claim 32, wherein the fluid comprises 10% hydroxypropyl acrylate (HPA).

36. The process according to claim 26, wherein the fluid comprises about 0.25% tetraethylene glycol diacrylate (TEGDA).

37. The process according to claim 26, wherein the fluid comprises 0.25–6% trimethylolpropane triacrylate (TMPTA).

38. The modified porous polymeric material of claim 26, wherein the polymeric material is exposed to ultraviolet light for 0.025–2.5 seconds.

39. The modified porous polymeric material of claim 38, wherein the polymeric material is exposed to ultraviolet light for less than one second.

40. The modified porous polymeric material of claim 39, wherein the polymeric material is exposed to ultraviolet light for about 0.35 seconds.

41. The modified porous polymeric material of claim 26, wherein the intensity of UV light having wavelengths of 395–445 nm is 0.5–10 watts/cm$^2$.

42. The modified porous polymeric material of claim 26, wherein the intensity of UV light having wavelengths of 320–390 nm is 0.5–10 watts/cm$^2$.

43. The modified porous polymeric material of claim 26, wherein the intensity of UV light having wavelengths of 280–320 nm is 0.5–10 watts/cm$^2$.

44. The modified porous polymeric material of claim 26, wherein the intensity of UV light having wavelengths of 250–260 nm is 0.05–1.0 watts/cm$^2$.

45. The modified porous polymeric material of claim 26, wherein the at least one type of acrylate monomer is bonded to the polymeric material.

46. The modified porous polymeric material of claim 26, wherein the ultraviolet light penetrates at least 30% of the polymeric material.

47. The modified porous polymeric material of claim 26, wherein the ultraviolet light penetrates at least 50% of the polymeric material.

48. The modified porous polymeric material of claim 26, wherein the ultraviolet light penetrates at least 60% of the polymeric material.

49. The process according to claim 1, wherein applying said ultraviolet light to said surface includes:
   activating an ultraviolet light source to produce said ultraviolet light;
   focusing said ultraviolet light at a focal point; and
   positioning said surface proximate said focal point.

50. The process according to claim 49, wherein said ultraviolet light is focused using an elliptical reflector.

* * * * *